No. 683,362. Patented Sept. 24, 1901.
M. WEISENFELD.
APPARATUS FOR GERMINATING GRAIN.
(Application filed May 17, 1901.)
(No Model.) 2 Sheets—Sheet 1.
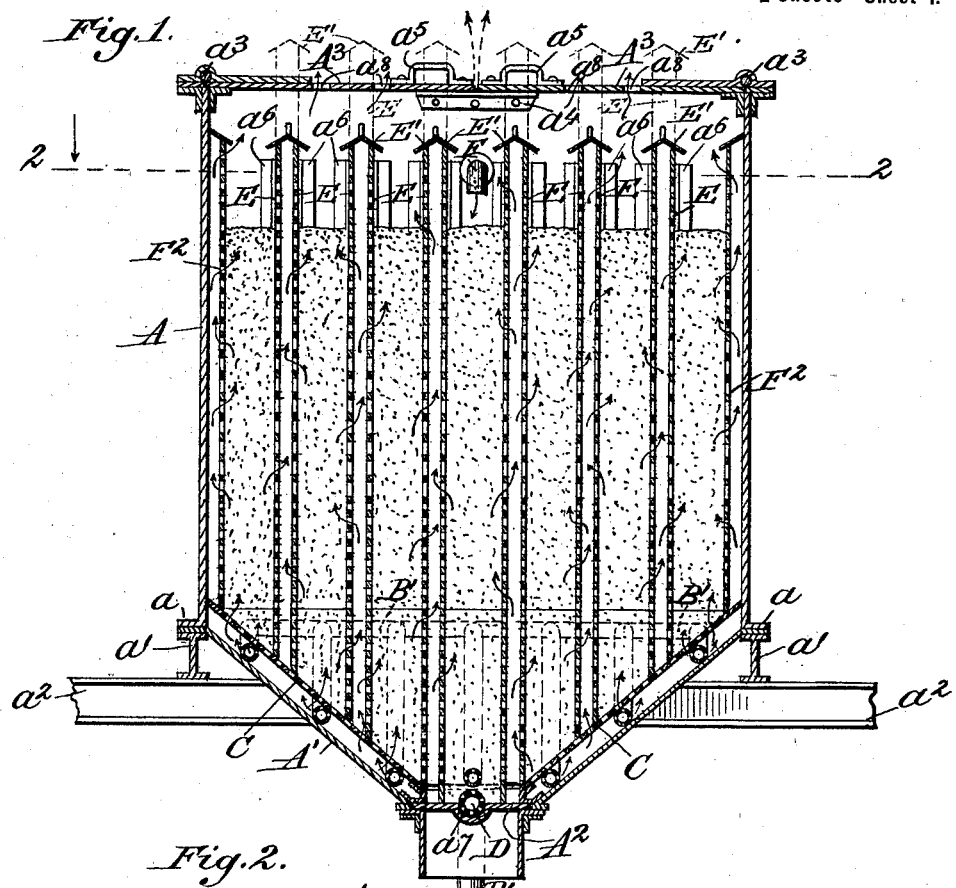
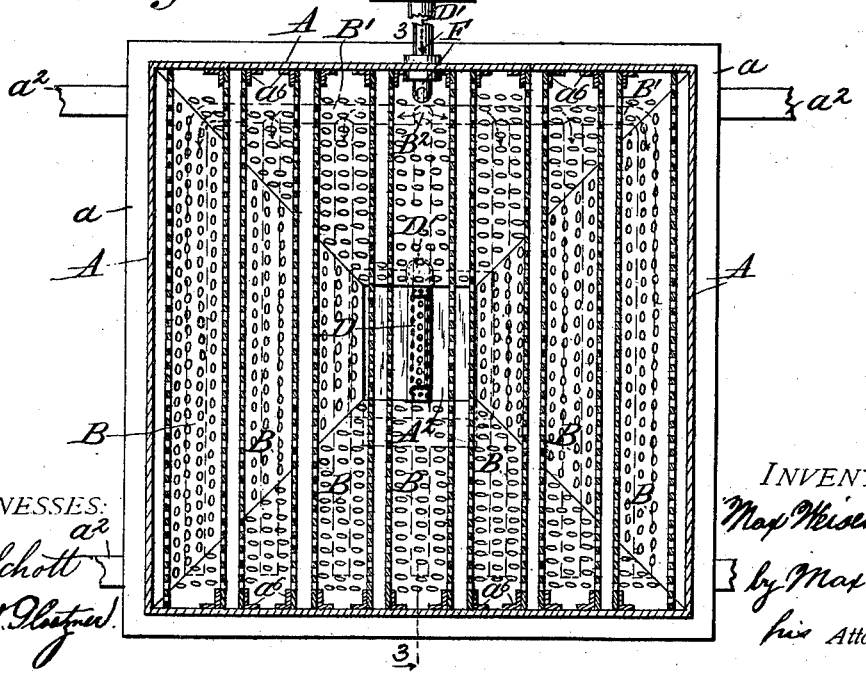

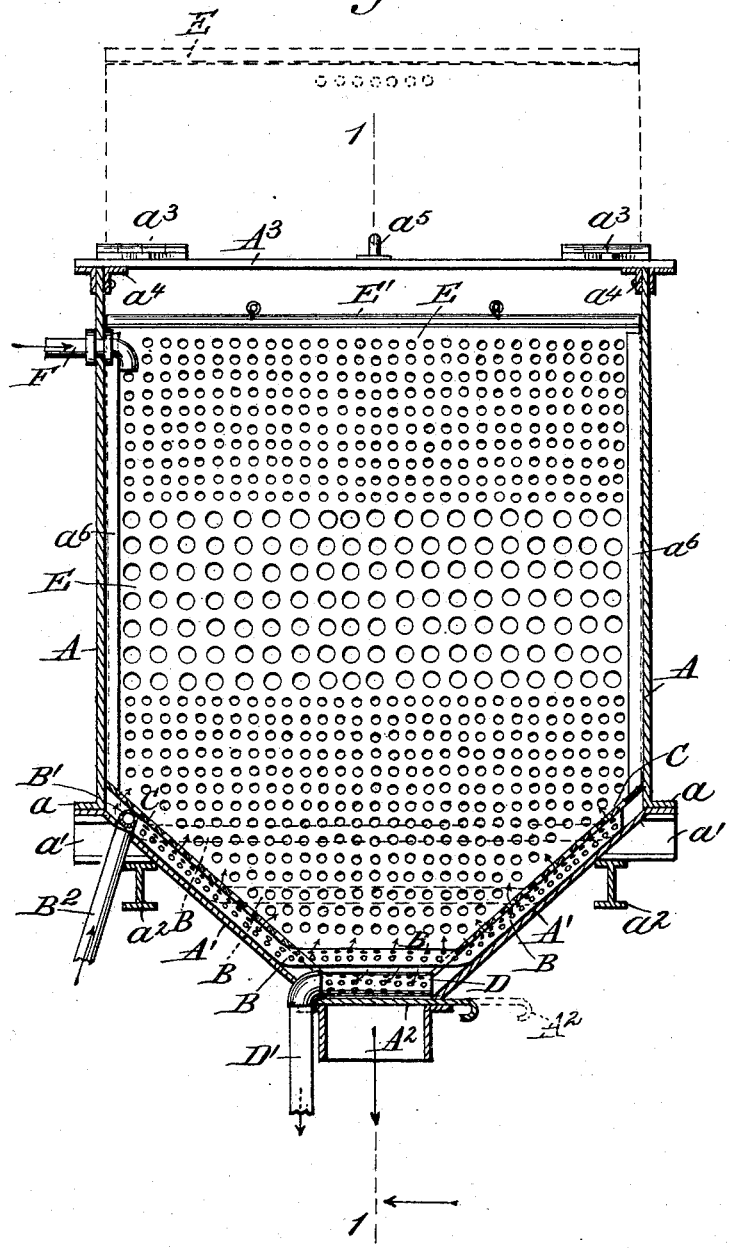

UNITED STATES PATENT OFFICE.

MAX WEISENFELD, OF MUNICH, GERMANY.

APPARATUS FOR GERMINATING GRAIN.

SPECIFICATION forming part of Letters Patent No. 683,362, dated September 24, 1901.

Application filed May 17, 1901. Serial No. 60,726. (No model.)

*To all whom it may concern:*

Be it known that I, MAX WEISENFELD, a citizen of the Empire of Germany, residing at Munich, in the Empire of Germany, have invented certain new and useful Improvements in Apparatus for Germinating Grain; and I do hereby declare the following to be a full, clear, and exact description of the invention, such as will enable others skilled in the art to which it appertains to make and use the same.

My invention relates to an improvement in apparatus for malting grain, and in particular to a steeping-vat in which after the steeping process has been carried out the germination of the grain may be proceeded with.

The object of my invention is to provide a steeping-vat which can be operated with the minimum amount of labor and which will occupy a minimum amount of space, while at the same time permitting the rapid and uniform germination of the grain.

With this general object in view my invention consists in the features, details of construction, and combination of parts, which will first be described in connection with the accompanying drawings and then particularly pointed out in the claims.

In the drawings, Figure 1 is a central vertical section of a steeping-vat embodying my invention, taken on the line 1 1 of Fig. 3; Fig. 2, a horizontal section on the line 2 2 of Fig. 1, and Fig. 3 a vertical section on the line 3 3 of Fig. 2.

Referring to the drawings, A is the outer wall of a steeping-vat, which is provided with a hopper-bottom A', having an outlet arranged to be closed by a slide or gate $A^2$. The steeping-vat is supported in any suitable manner—as, for example, by outward-projecting lugs or flanges $a$, resting upon sleepers $a'$, lying transversely upon suitable joists $a^2$, which are supposed to be supported by the walls of the building (not shown) in an obvious manner. The top of the hopper is provided with suitable means for closing it—such, for example, as the double doors $A^3$, which are hinged to the sides of the hopper, as shown at $a^3$, the doors resting when closed upon brackets or ledges $a^4$, secured inside the hopper, one of said brackets being shown in Fig. 1. Suitable handles $a^5$ are provided by means of which the doors may be swung back. Two opposite walls of the vat are provided upon their inner faces with vertical guideways formed in any suitable manner—as, for example, by securing angle-irons in pairs at suitable distances apart upon the said inner faces of the said walls, these angle-irons being shown at $a^6$, the guideways serving a purpose hereinafter described.

Upon the bottom of the hopper and inside the same are located a series of perforated pipes B, connected at one end by a cross pipe or header B', which is connected to a feed-pipe $B^2$, leading to a suitable source of air-supply—such, for example, as a fan or blower. (Not shown.) The pipes B are bent so as to conform to the shape of the bottom of the vat, as will be clear from Fig. 3, and arranged at such a distance apart that said pipes will lie in the spaces between the guideways.

The hopper is provided with a perforated false bottom C, which is above the pipes B and the header B', and has a central opening in line with the discharge-outlet of the vat, the false bottom conforming to the hopper-shaped bottom of the vat.

The slide or gate $A^2$, which closes the discharge-outlet, is provided with a trough-shaped portion, (indicated at $a^7$, Fig. 1,) which when the slide is closed receives a perforated drain-pipe D, extending horizontally from a vertical pipe D', extending downward from the vat.

In each pair of guideways is located a removable partition E, having double perforated walls, the area of the perforations near the central portion of the vat being greater than near the top or bottom of the vat, as will be clear from Fig. 3. The said partitions are open at the bottom and provided with suitable caps or roofs, as indicated at E', Fig. 1. Two sides of the vat are also provided with inner linings $F^2$, parallel to the partitions, which linings are perforated and are located at a short distance from their respective sides, as shown in Fig. 1.

The covers or lids are preferably provided with openings, as indicated at $a^8$, Fig. 1.

A water-supply pipe F has its end projecting through one wall of the vat into the interior of the same near the top.

The operation of my apparatus is as follows: The grain to be malted is placed in the vat in the compartments formed between the partitions, the doors or covers being opened for this purpose, after which said doors are closed. Water is then admitted to the vat in suitable quantity through the water-supply pipe F and the grain allowed to steep for the desired time. After this the water is drawn off through the drain-pipe D. Moist air is now forced through the pipes B and enters the space below the false bottom, from whence it escapes upward directly through the grain in the compartments and through the hollow partitions into the grain in the manner indicated by the arrows in Fig. 1, finally passing off from the vat through the openings in the covers or lids. Owing to the fact that the perforations of the partitions have a greater area nearer the center of the vat than at the top or bottom, a greater quantity of air is supplied at the center of the grain in the various compartments where the development of heat is the greatest. The heated gases or vapors developed by the germinating process escape upward through the hollow walls and leave the vat through the openings in the covers or doors. Since in this apparatus the air can penetrate the grain-compartments equally well from all sides, equally favorable conditions are afforded throughout the entire height of the compartments for germination. After germination is accomplished the slide A² is opened and the central grain-compartment is emptied through the discharge-outlet. Thereupon the covers A³ are opened and all the double walls elevated at once about thirty to forty centimeters, as indicated by the dotted lines, by suitable lifting means, so that the grain in the side compartments can also run out automatically through the outlet.

The construction of this apparatus offers the advantageous possibility of utilizing space to the utmost, since the intermediate spaces between the separate compartments can be made quite small and a uniformly complete charging of compartments is unavoidable.

Having thus fully described my invention, what I claim as new, and desire to secure by Letters Patent, is—

1. The combination, with a stationary steeping-vat having an outlet in its bottom through which the grain may be removed, and means for closing said outlet, of a plurality of movable hollow perforated partitions located in said vat, whereby by moving the partitions the grain may be discharged through the outlet, and means for forcing air into said hollow partitions.

2. The combination, with a stationary steeping-vat having a hopper-bottom provided with an outlet through which the grain may be removed, and means for closing said outlet, of a plurality of movable hollow perforated partitions located in said vat, whereby by moving the partitions the grain may be discharged through the outlet, and means for forcing air into said hollow partitions.

3. The combination, with a stationary steeping-vat having a bottom, a perforated false bottom and an outlet through both whereby the grain may be removed from the vat, of a plurality of movable hollow perforated partitions located in the vat above the false bottom, whereby by moving the partitions, the grain may be discharged through the outlet, and means for supplying air beneath the false bottom.

4. The combination, with a stationary steeping-vat, having an outlet and means for closing the outlet, of a plurality of movable hollow perforated partitions arranged to divide the vat in strata, the perforated area per square unit being larger at the central portion of the partitions than at the ends of said partitions, and means for forcing air into the hollow partitions.

5. The combination, with a steeping-vat, having a hopper-bottom and a discharge-outlet in said bottom, of means for closing said outlet, a perforated false bottom conforming in shape to the shape of the hopper-bottom and provided with an opening registering with the outlet of the vat, a plurality of hollow perforated partitions removably located in the vat over said false bottom, means for supplying water to the vat, means for supplying air beneath the false bottom, and covers for the top of the vat.

In testimony whereof I affix my signature in presence of two witnesses.

MAX WEISENFELD.

Witnesses:
RUDOLPH W. HIEBL,
A. WEINBAUER.